(12) United States Patent
Zhuang et al.

(10) Patent No.: US 9,399,433 B2
(45) Date of Patent: Jul. 26, 2016

(54) AUTOMOTIVE CAMERA SYSTEM AND THE DATA PROCESSING METHOD BASED ON ITS SHOOTING ANGLE CHANGING SYNCHRONOUSLY WITH THE AUTOMOTIVE SPEED

(71) Applicant: SHENZHEN PROTRULY ELECTRONICS CO., LTD, Shenzhen (CN)

(72) Inventors: Min Zhuang, Shenzhen (CN); Peng Lu, Shenzhen (CN)

(73) Assignee: SHENZHEN PROTRULY ELECTRONICS CO., LTD, Shenzhen (CN)

(*) Notice: Subject to any disclaimer, the term of this patent is extended or adjusted under 35 U.S.C. 154(b) by 0 days.

(21) Appl. No.: 13/918,218

(22) Filed: Jun. 14, 2013

(65) Prior Publication Data
US 2014/0214270 A1    Jul. 31, 2014

(30) Foreign Application Priority Data
Jan. 25, 2013  (CN) .......................... 2013 1 0029163

(51) Int. Cl.
*B60R 11/04* (2006.01)
*H04N 5/232* (2006.01)

(52) U.S. Cl.
CPC ............ *B60R 11/04* (2013.01); *H04N 5/23296* (2013.01)

(58) Field of Classification Search
None
See application file for complete search history.

(56) References Cited

U.S. PATENT DOCUMENTS

| | | | | |
|---|---|---|---|---|
| 5,734,337 A * | 3/1998 | Kupersmit | .................... | 340/937 |
| 6,420,704 B1 * | 7/2002 | Berenz et al. | ................. | 250/330 |
| 8,559,673 B2 * | 10/2013 | Fairfield et al. | ............... | 382/104 |
| 2009/0125234 A1 * | 5/2009 | Geelen et al. | ................. | 701/209 |
| 2009/0179987 A1 * | 7/2009 | Kim | .............. | 348/142 |
| 2010/0225762 A1 * | 9/2010 | Augst | ........................... | 348/148 |
| 2011/0058041 A1 * | 3/2011 | Kister | .......................... | 348/149 |
| 2012/0002056 A1 * | 1/2012 | Nam et al. | .................... | 348/169 |
| 2012/0013742 A1 * | 1/2012 | Fairchild et al. | ............. | 348/148 |
| 2012/0185165 A1 * | 7/2012 | Geelen et al. | ................. | 701/436 |
| 2012/0236122 A1 * | 9/2012 | Fukawa | ........................ | 348/46 |
| 2014/0139669 A1 * | 5/2014 | Petrillo et al. | ................ | 348/148 |

FOREIGN PATENT DOCUMENTS

JP    2010-116036    *    5/2010

* cited by examiner

*Primary Examiner* — John R Olszewski
*Assistant Examiner* — James M McPherson
(74) *Attorney, Agent, or Firm* — Muncy, Geissler, Olds & Lowe, P.C.

(57) ABSTRACT

An automotive camera system and a data processing method based on its shooting angles synchronizing with automotive speeds are provided. The method comprises the following steps: obtain a current velocity value through a velocity acquisition device; determine a corresponding automotive speed grade; look up a prestored correspondence relationship table and finding out a synchronized camera lens zoom number synchronizing with automotive speed grades; control a camera focal motor zooming a camera lens to the number, and achieving the synchronization of the shooting angle and the automotive speed. When applying the camera system and the method as stated in the present invention, the distant road can be clearly seen in high speed driving, and dangers can be found ahead in advance, thus improves the driving safety.

4 Claims, 3 Drawing Sheets

AUTOMOTIVE CAMERA SYSTEM AND THE DATA PROCESSING METHOD BASED ON ITS SHOOTING ANGLE CHANGING SYNCHRONOUSLY WITH THE AUTOMOTIVE SPEED

CROSS-REFERENCES TO RELATED APPLICATIONS

This application claims the priority of Chinese patent application no. 201310029163.8, filed on Jan. 25, 2013, the entire contents of all of which are incorporated herein by reference.

FIELD OF THE INVENTION

The present invention relates to the field of automotive electronics, and more particularly to an automotive camera system and the data processing method based on its shooting angle changing synchronously with the automotive speed.

BACKGROUND

With the development of science and technology as well as the improvement of people's living standards, driving automobiles is becoming more and more popular, and more and more families own their automobiles.

The automobile loaded camera system of the prior art, using lenses with fixed focal length, the visual angle is not continuously adjustable. For example, night vision systems in BMW and Benz are using fixed focal length lens, which makes the users not be able to observe in a wide angle when the vehicle is running at a low speed, and not be able to see the objects 100 meters away when the vehicle is running at a high speed, thus not be able to find the dangerous road conditions ahead in advance.

Therefore, the prior art needs to be improved and developed.

BRIEF SUMMARY OF THE DISCLOSURE

The technical problems to be solved in the present invention is, aiming at the defects of the prior art, providing an automotive camera system and a data processing method based on its shooting angle changing synchronously with the automotive speed, which adds new functions to automotive camera system, i.e., the shooting angle of the automotive camera system changing synchronously with the automotive speeds, thus improving the driving safety, providing conveniences to users.

The technical solution of the present invention to solve the said technical problems is as follows:

A data processing method based on the shooting angle of the automotive camera system changing synchronously with the automotive speed, wherein, it comprises the following steps:

A. obtain the current running velocity through the velocity acquisition device when the automobile is running;
B. determine the speed grade according to the obtained current velocity value;
C. based on the determined current speed grade, look up the prestored correspondence relationship table of each automotive speed grades and the camera lens zoom numbers changing synchronously with each automotive speed grade, find out the camera lens zoom number changing synchronously with the current speed grade under current driving conditions;
D. control the camera focal motor zooming the camera lens to the found camera lens zoom number, and achieve the synchronization between the shooting angle and the automotive speed.

The said data processing method based on the shooting angle of the automotive camera system changing synchronously with the automotive speed, wherein, it also comprises the following step before the said step A:

S: prestore the correspondence relationship table of automotive speed grades as well as the camera lens zoom numbers changing synchronously with the automotive speed grades.

The said data processing method based on the shooting angle of the automotive camera system changing synchronously with the automotive speed, wherein, the said step S also comprises:

S1. receive the user's instructions and set up the correspondence relations between each automotive speed grade and the camera lens zoom number changing synchronously with the automotive speed grade as requested.

The said data processing method based on the shooting angle of the automotive camera system changing synchronously with the automotive speed, wherein, the said current automotive velocity as in step A, includes the current running velocity value, velocity changing rate value and/or acceleration value.

The said data processing method based on the shooting angle of the automotive camera system changing synchronously with the automotive speed, wherein, the said step B also comprises:

Divide the automotive velocities into the following speed grades:

It is defined as the first speed grade, when the velocity of the automobile is no more than 10 km/h;
It is defined as the second speed grade, when the velocity of the automobile is between 11 and 20 km/h;
It is defined as the third speed grade, when the velocity of the automobile is between 21 and 30 km/h;
It is defined as the forth speed grade, when the velocity of the automobile is between 31 and 40 km/h;
It is defined as the fifth speed grade, when the velocity of the automobile is between 41 and 50 km/h;
It is defined as the sixth speed grade, when the velocity of the automobile is between 51 and 60 km/h;
It is defined as the seventh speed grade, when the velocity of the automobile is between 61 and 70 km/h;
It is defined as the eighth speed grade, when the velocity of the automobile is between 71 and 80 km/h;
It is defined as the ninth speed grade, when the velocity of the automobile is between 81 and 90 km/h;
It is defined as the tenth speed grade, when the velocity of the automobile is between 91 and 100 km/h;
It is defined as the eleventh speed grade, when the velocity of the automobile is between 101 and 110 km/h;
It is defined as the twelfth speed grade, when the velocity of the automobile is more than 110 km/h.

The said data processing method based on the shooting angle of the automotive camera system changing synchronously with the automotive speed, wherein, the corresponding relationship between the automotive speed grades and the camera lens zoom numbers changing synchronously with the automotive speed grades of step C, in details, it comprises:

The according camera lens zoom number is 1, when the velocity of the automobile is no more than 10 km/h;
The according camera lens zoom number is 2, when the velocity of the automobile is between 11 and 20 km/h;

The according camera lens zoom number is 3, when the velocity of the automobile is between 21 and 30 km/h;

The according camera lens zoom number is 4, when the velocity of the automobile is between 31 and 40 km/h;

The according camera lens zoom number is 5, when the velocity of the automobile is between 41 and 50 km/h;

The according camera lens zoom number is 6, when the velocity of the automobile is between 51 and 60 km/h;

The according camera lens zoom number is 7, when the velocity of the automobile is between 61 and 70 km/h;

The according camera lens zoom number is 8, when the velocity of the automobile is between 71 and 80 km/h;

The according camera lens zoom number is 9, when the velocity of the automobile is between 81 and 90 km/h;

The according camera lens zoom number is 10, when the velocity of the automobile is between 91 and 100 km/h;

The according camera lens zoom number is 10, when the velocity of the automobile is between 101 and 110 km/h;

The according camera lens zoom number is 10, when the velocity of the automobile is more than 110 km/h.

An automotive camera system, wherein, it comprises:

the velocity acquisition module, used to obtain the current velocity value of the automobile when it is running;

the determination module, used to determine the speed grade of the automobile based on its current velocity value;

the searching and matching module, used to look up the prestored correspondence relationship table of automotive speed grades and the camera lens zoom numbers changing synchronously with the automotive speed grades according to the determined current automotive speed grades, and find out the camera lens zoom numbers changing synchronously with the current speed grade under current driving conditions;

the controlling module, used to control the camera focal motor zooming the camera lens to the found camera lens zoom numbers, and achieving the synchronization of the shooting angle and the automotive speed.

the automotive camera system, wherein, it also comprises: and the storage module, used to prestore the correspondence relationship table of each automotive speed grade and the camera lens zoom number changing synchronously with each automotive speed grade.

The automotive camera system, wherein, it also includes:

the setting module, used to receive the user's instructions and set up the correspondence relationship table of automotive speed grades and the camera lens zoom numbers changing synchronously with automotive speed grades as requested; and the automotive camera system, wherein, the said current automotive velocity value includes the current running velocity value, velocity changing rate value and/or acceleration value.

The automotive camera system and the data processing method based on the shooting angle of the automotive camera system changing synchronously with the automotive speed provided in the present invention, due to adoption of a zoom lens and obtaining the information of velocity, velocity changing rate or acceleration, etc through speed acquisition devices (such as CAN, GPS, OBD, etc), control the system to find out the appropriate camera zoom number matching the current driving status through the corresponding algorithm process, and control the camera lens zoom number changing synchronously with the automotive speed. The present invention adds new functions to the automotive camera system, i.e., the function of achieving the shooting angles of the automotive camera system changing synchronously with the automotive speeds. During driving, without any operations, the users are able to experience the pleasure of synchronization of the shooting angle and the automotive speed, and the users are able to not only observe in a wide angle when the automobile is running at a low speed, but also see the distant road clearly during high speed driving, and find the dangers ahead in advance, thus the driving safety is improved and more conveniences to users are provided.

DETAILED DESCRIPTION

In order to make the purpose, technical solution and the advantages of the present invention clearer and more explicit, further detailed descriptions of the present invention is stated here, referencing to the attached drawings and some embodiments of the present invention. It should be understood that the detailed embodiments of the invention described here are used to explain the present invention only, instead of limiting the present invention.

Figure 1:
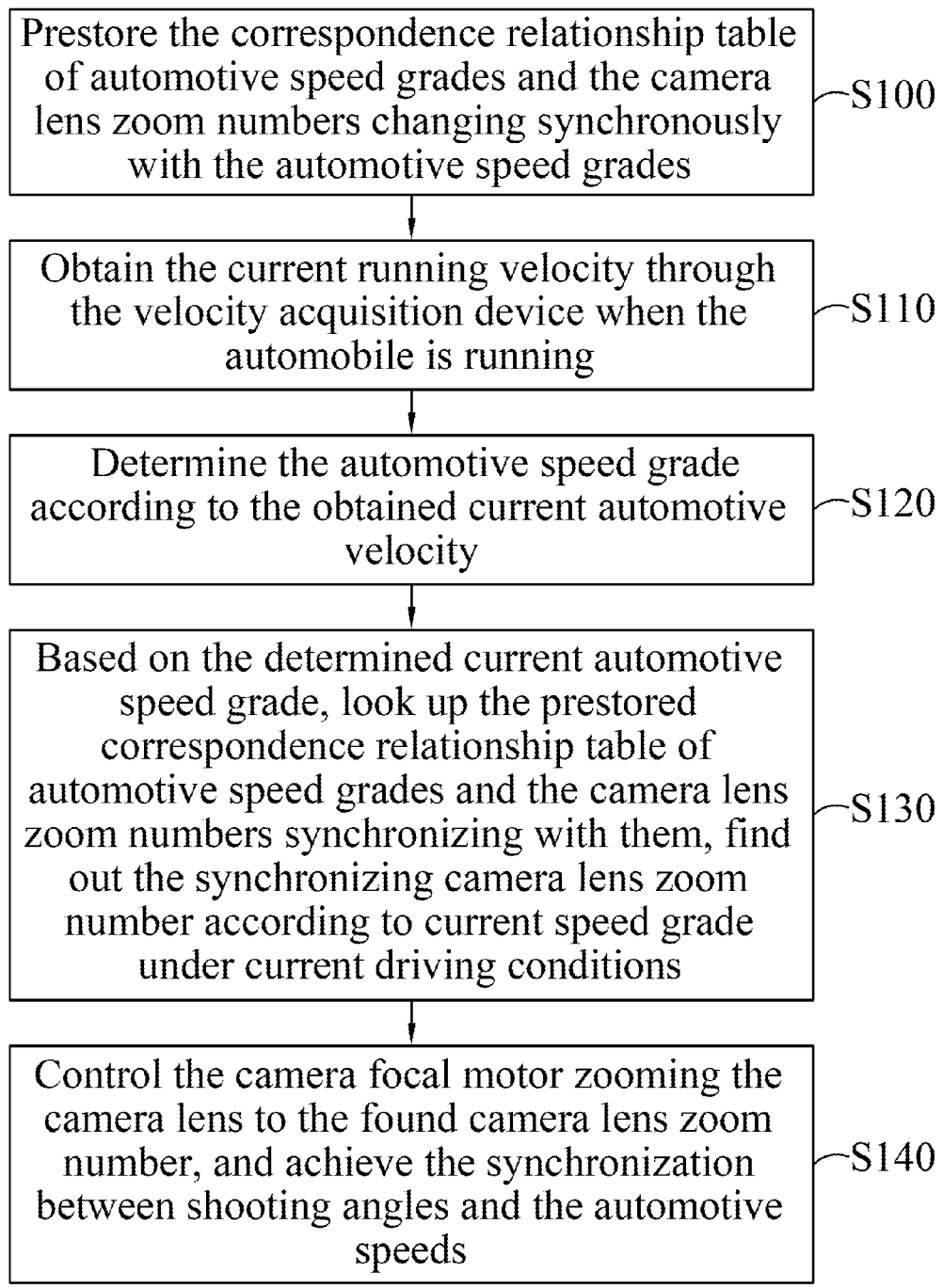
FIG. 1 illustrates the flow chart of a preferred embodiment of the automotive camera system and the data processing method based on its shooting angle changing synchronously with the automotive speed in the present invention.

Refer to FIG. 1, which is the flow chart of a preferred embodiment of the automotive camera system and the data processing method based on its shooting angle changing synchronously with the automotive speed in the present invention.

Step S110: Obtain the current automotive velocity value through the velocity acquisition device when the automobile is running.

When a user is driving an automobile running on the road, which has installed the camera system whose shooting angle synchronizing with the automotive speed, the running velocity value of the automobile on the road will be obtained through the velocity acquisition device of the automobile.

Wherein, the said current automotive velocity as defined in step S110 includes the current running velocity value, velocity changing rate value and/or acceleration value.

That is, the speed grades set in the automotive camera system are based on the obtained current automotive velocity value, while the current automotive velocity value includes the current automotive velocity value, velocity changing rate value and/or acceleration value per hour. Then, it goes to next step S120.

Step S120: Determine the automotive speed grade based on the obtained current automotive velocity value.

When the current running velocity of the automobile is obtained by the velocity acquisition device in the automotive camera system, the system will determine and obtain the current speed grade according to the obtained automotive velocity.

Then, it goes to next step S130.

Step S130: Based on the determined current automotive speed grade, look up the prestored correspondence relationship table of automotive speed grades and the camera lens zoom numbers changing synchronously with the automotive speed grades; find out the camera lens zoom numbers changing synchronously with the current speed grades under current driving conditions.

First, determine the automotive speed grade according to the automotive running velocity value after obtaining the velocity value. The automotive camera system will then look up the prestored correspondence relationship table of automotive speed grades and the camera lens zoom numbers changing synchronously with the automotive speed grades, and find out the camera lens zoom number changing synchronously with the current speed grade under current driving conditions. Then it goes to next step S140.

Step S140: Control the camera focal motor zooming the camera lens to the matched camera lens zoom number, and achieve the synchronization between the shooting angle and the automotive speed.

When the automobile is running on the road normally, its automotive camera system will control the camera focal motor zooming the camera lens to the found camera lens zoom number, which is achieved through looking up the prestored correspondence relationship table of automotive speed grades and the camera lens zoom numbers changing synchronously with the automotive speed grades. Thus achieves the synchronization of the shooting angle and the automotive speed.

Wherein, before the said step S110 above, it also comprises:

Step S100: Prestore the correspondence relationship table of automotive speed grades and the camera lens zoom numbers changing synchronously with the automotive speed grades.

In the automotive camera system, since it needs to control the camera focal motor zooming the camera lens to the found camera lens zoom number, thus, it is required to prestore the correspondence relationship table of automotive speed grades and the camera lens zoom numbers changing synchronously with the automotive speed grades.

In addition, it is possible to set up the corresponding relations between the automotive speed grades and the camera lens zoom numbers changing synchronously with the automotive speed grades following user's requirements. As stated below, receive the user's instructions and set up the corresponding relations between the automotive speed grades and the camera lens zoom numbers changing synchronously with the automotive speed grades as requested.

For example, the automotive velocity values can be preset to divide into the following speed grades:

It is defined as the first speed grade, when the velocity of the automobile is no more than 10 km/h;

It is defined as the second speed grade, when the velocity of the automobile is between 11 and 20 km/h;

It is defined as the third speed grade, when the velocity of the automobile is between 21 and 30 km/h;

It is defined as the forth speed grade, when the velocity of the automobile is between 31 and 40 km/h;

It is defined as the fifth speed grade, when the velocity of the automobile is between 41 and 50 km/h;

It is defined as the sixth speed grade, when the velocity of the automobile is between 51 and 60 km/h;

It is defined as the seventh speed grade, when the velocity of the automobile is between 61 and 70 km/h;

It is defined as the eighth speed grade, when the velocity of the automobile is between 71 and 80 km/h;

It is defined as the ninth speed grade, when the velocity of the automobile is between 81 and 90 km/h;

It is defined as the tenth speed grade, when the velocity of the automobile is between 91 and 100 km/h;

It is defined as the eleventh speed grade, when the velocity of the automobile is between 101 and 110 km/h;

It is defined as the twelfth speed grade, when the velocity of the automobile is more than 110 km/h.

In the present embodiment, according to the settings above, the camera lens zoom numbers also can be set to change synchronously with the automotive speed grades as follows:

The according camera lens zoom number is 1, when the velocity of the automobile is no more than 10 km/h;

The according camera lens zoom number is 2, when the velocity of the automobile is between 11 and 20 km/h;

The according camera lens zoom number is 3, when the velocity of the automobile is between 21 and 30 km/h;

The according camera lens zoom number is 4, when the velocity of the automobile is between 31 and 40 km/h;

The according camera lens zoom number is 5, when the velocity of the automobile is between 41 and 50 km/h;

The according camera lens zoom number is 6, when the velocity of the automobile is between 51 and 60 km/h;

The according camera lens zoom number is 7, when the velocity of the automobile is between 61 and 70 km/h;

The according camera lens zoom number is 8, when the velocity of the automobile is between 71 and 80 km/h;

The according camera lens zoom number is 9, when the velocity of the automobile is between 81 and 90 km/h;

The according camera lens zoom number is 10, when the velocity of the automobile is between 91 and 100 km/h;

The according camera lens zoom number is 10, when the velocity of the automobile is between 101 and 110 km/h;

The according camera lens zoom number is 10, when the velocity of the automobile is more than 110 km/h.

When the embodiment of the present invention is under implementing, the system receives the user's instructions and sets up the corresponding relation between the automotive speed grades and the synchronizing camera lens zoom numbers as requested.

The automotive speeds and the camera lens zoom numbers corresponding to the automotive speeds in the above example can be shown in the following table:

| | Automotive Speed (km/h) | | | | | | | | | | | |
|---|---|---|---|---|---|---|---|---|---|---|---|---|
| | <=10 | 11-20 | 21-30 | 31-40 | 41-50 | 51-60 | 61-70 | 71-80 | 81-90 | 91-100 | 101-110 | >=110 |
| Camera lens zoom numbers | 1 | 2 | 3 | 4 | 5 | 6 | 7 | 8 | 9 | 10 | 10 | 10 |

Figure 2:
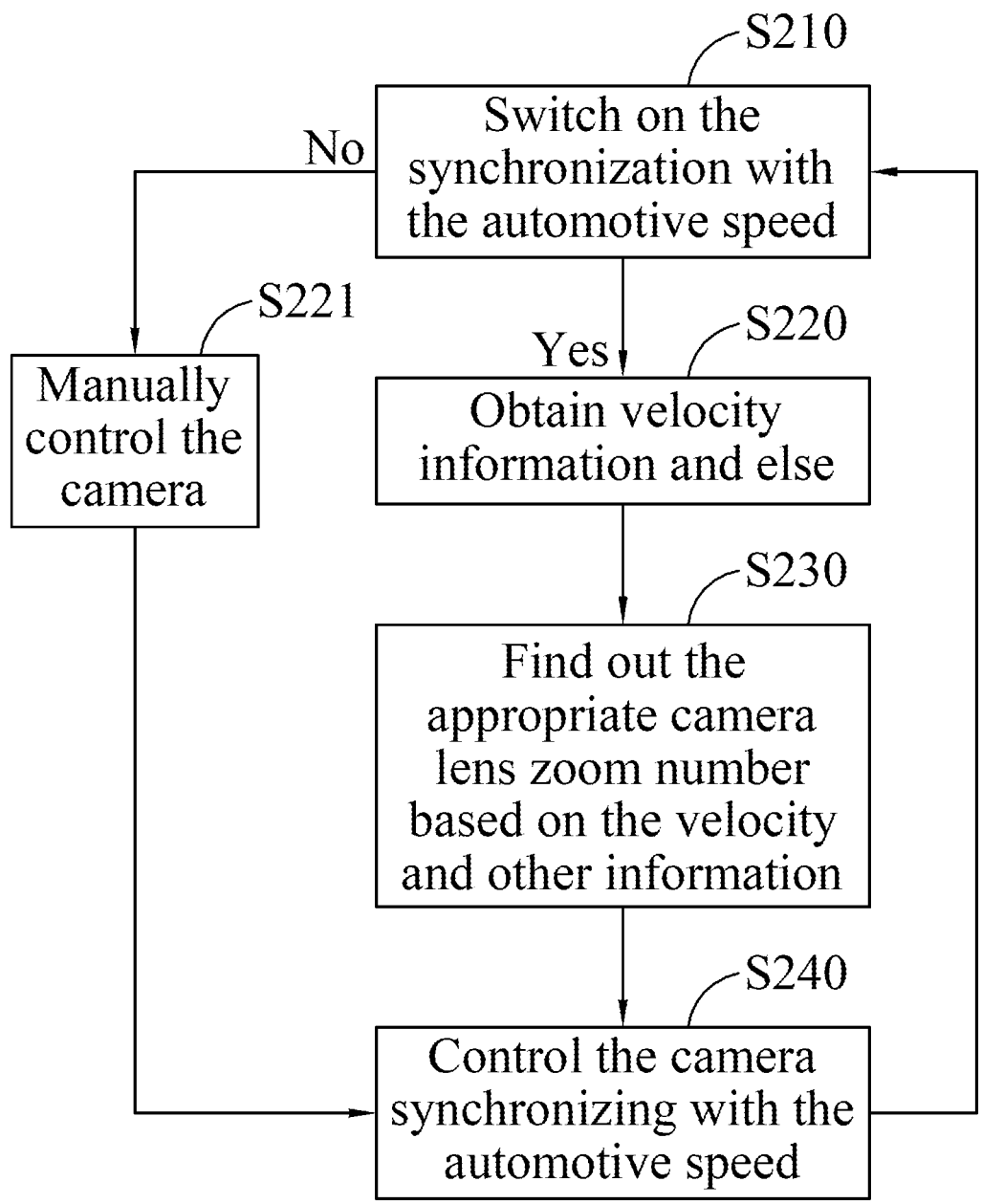
FIG. 2 illustrates the flow chart of a specific application embodiment of the automotive camera system and the data processing method based on its shooting angle changing synchronously with the automotive speed in the present invention.

The further detailed descriptions of the present invention will be achieved through the following specific application embodiment:

FIG. 2 is the flow chart of a specific application embodiment of the camera system and the data processing method based on the shooting angle of the automotive camera system changing synchronously with the automotive speed in the present invention. As shown in FIG. 2, the present invention is explained by an example of automotive camera system; the flow chart of this embodiment comprises the following steps:

Step S210: switch on the synchronization with the automotive speed;

When the user starts the automobile, the automobile is running in a normal state, then the user starts the automotive camera system and switches on the synchronization with the automotive speed, if there is no system settings on camera lens zoom number changing synchronously with the automotive speed in the automotive camera system, or it is unable to normally switch on the synchronization with the automotive speed, then, goes to step S221, i.e. manually control the camera; if the switch of the camera lens zoom numbers changing synchronously with the automotive speeds can be turned on normally, then goes to step S220, i.e. to obtain velocity information and else.

Step S220: obtain velocity information and else;

Since the automotive camera system has switched on the function of camera lens zoom number synchronization with automotive speed normally, the automotive camera system will obtain the velocity value and other information of the automobile in running state automatically, wherein, the current automotive velocity value includes the current running velocity value, velocity changing rate value and/or acceleration value. Then, it goes to step S230.

Step S230, find out the appropriate camera lens zoom number based on the velocity and other information;

The automotive camera system will find out the appropriate camera lens zoom number based on the current velocity value, velocity changing rate value and/or acceleration value information of the automobile in running, obtained in last step. Then, it goes to step S240.

In addition, step S221, manually control the camera;

This step is prepared for the case of there is no system settings on the camera lens zoom number synchronizing with the automotive speed in the automotive camera system, or it is unable to normally turn on the synchronization switch, then, it is required to adjust the automotive camera system lens zoom number manually, when the adjustment is accomplished through this method, it goes to step S240.

Step S240, control the camera synchronizing with the automotive speed;

After above steps are accomplished, automatically zoom the automotive camera system lens to synchronize with the automotive speed, when it is running normally. Thus achieve the synchronization between camera lens zoom numbers and automotive speeds.

In a word, the embodiments of the present invention provide a data processing method based on the shooting angle of the automotive camera system changing synchronously with the automotive speed, which adds new functions to automotive camera system, i.e., the function of achieving the camera shooting angles synchronizing with the automotive speeds, thus improve the driving safety and provide conveniences to users.

Figure 3:
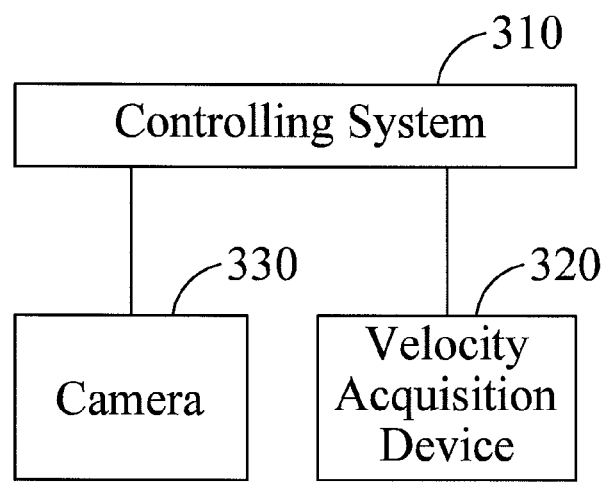
FIG. 3 illustrates the system block diagram of the automotive camera system in the embodiment of the present invention.

Based on the data processing method of the shooting angle of the automotive camera system changing synchronously with the automotive speed, as in the embodiments above, the present invention also provides an automotive camera system, the automotive camera system is based on the hardware equipment shown in FIG. 3, which is the hardware equipment connection structural diagram of the automotive camera system in the embodiment of the present invention. It includes:

The controlling system 310, which is used to look up the prestored correspondence relationship table of automotive speed grades and the camera lens zoom numbers synchronizing with them, find out the camera lens zoom number synchronizing with current speed grade under current driving conditions; then control the camera focal motor zooming the camera lens to the found camera lens zoom number, and achieve synchronization of shooting angles and automotive speeds.

The velocity acquisition device 320, which is used to obtain the current automotive velocity in driving.

The camera 330, whose lens is zoomed to match the appropriate zoom number under current driving conditions, to ensure the wide range observation of road conditions in low speed driving and seeing the distant road condition in high speed driving.

Figure 4:
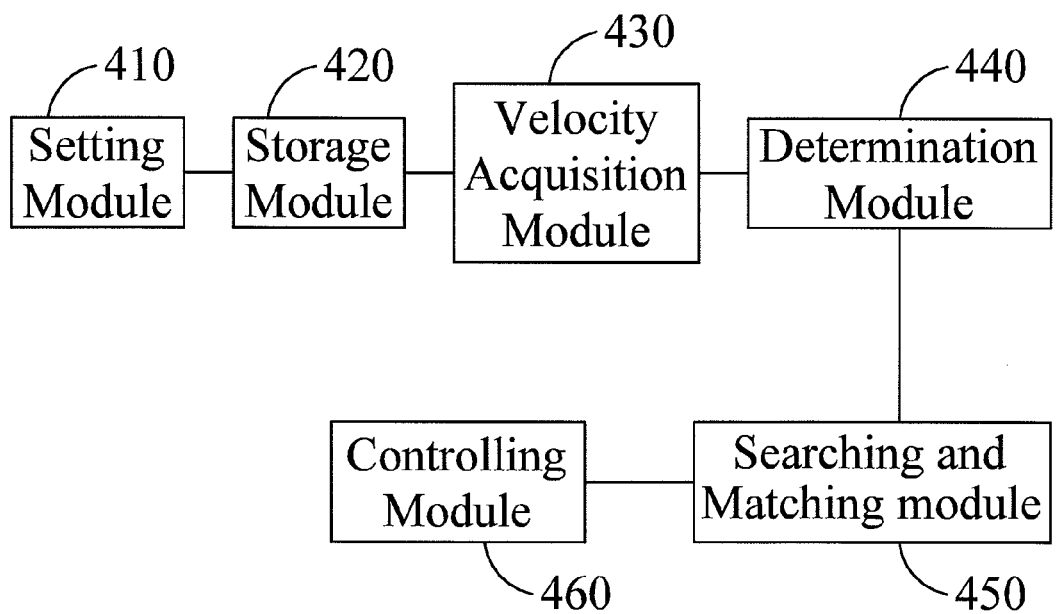
FIG. 4 illustrates the functional principal block diagram of the automotive camera system in the embodiment of the present invention.

Based on the hardware equipment shown in FIG. 3, as shown in FIG. 4, which is the software functions principle block diagram of the automotive camera system in the embodiment of the present invention. The said automotive camera system, includes:

The velocity acquisition module 430, which is used to obtain the current automotive velocity value when the automobile is running, as described in step S110.

The determination module 440, which is used to determine the speed grade based on the obtained current automotive velocity, as described in step S120.

The searching and matching module 450, which is used to look up the prestored correspondence relationship table of automotive speed grades and the camera lens zoom numbers synchronizing with them, find out the camera lens zoom number according to current speed grade under current driving conditions, as described in step S130.

The controlling module 460, which is used to control the camera focal motor zooming the camera lens to the found camera lens zoom number, and achieve the synchronization between the shooting angle and the automotive speed, as described in step S140.

The said automotive camera system, wherein, it also includes:

The storage module 420, which is used to prestore the correspondence relationship table of each automobile speed grades and the camera lens zoom numbers synchronizing with them, as described in step S100.

The said automotive camera system, wherein, it also includes:

The setting module 410, which is used to set up the correspondence relation of automotive speed grades and the synchronizing camera lens zooms as requested, after receiving the user's instructions, as described in step S1.

The said automotive camera system, wherein, the said current automotive velocity value includes the current running velocity value, velocity changing rate value and/or acceleration value, as described in the further contents in step S110.

In summary, the automotive camera system and the data processing method provided in the present invention, based on the shooting angle of the automotive camera system synchronizing with the automotive speed, due to adoption of a zoom lens, obtaining the information of velocity, velocity changing rate or acceleration through speed acquisition devices (such as CAN, GPS, OBD, etc), then the controlling system finds out the appropriate camera zoom number matching the current driving status through the corresponding algorithms process, and control the camera lens zoom number synchronizing with the automotive speed. The present invention adds new functions to the automobile loaded camera system, i.e., the function of realizing the shooting angles of the automotive camera system synchronizing with the automotive speeds. During driving, without any operations, the users are able to experience the pleasure of synchronization with the automotive speed, and the users are able to not only observe in a wide angle when the automobile is running at a low speed, but also see the distant road clearly during high speed driving, and find the dangers earlier, thus the driving safety is improved and more conveniences to users are provided.

It should be understood that, the application of the present invention is not limited to the above examples listed. It will be possible for a person skilled in the art to make modifications or replacements according to the above description, such as applying the said method of camera shooting angle synchronizing with the automotive speed in the traffic tools other than automobiles. All of these modifications or replacements shall all fall within the scope of the appended claims of the present invention.

What is claimed is:

1. A data processing method based on shooting angles of an automotive camera system changing synchronously with automotive speeds, comprising the following steps:
    prestoring a correspondence relationship table of automotive speed grades of an automobile and camera lens zoom numbers synchronizing with the automotive speed grades of the automobile by the automotive camera system, wherein the automotive camera system receives a user's instructions and sets up the correspondence relationship table between the automotive speed grades and the camera lens zoom numbers changing synchronously with the automotive speed grades as requested;
    obtaining a current automotive velocity of the automobile by a velocity acquisition device when the automobile is running on a road, wherein the automobile, which is movable, has installed the automotive camera system;
    determining a current automotive speed grade of the automobile by the automotive camera system according to the current automotive velocity obtained by the velocity acquisition device;
    based on the current automotive speed grade determined by the automotive camera system, looking up the correspondence relationship table, which is prestored by the automotive camera system, of the automotive speed grades of the automobile and the camera lens zoom numbers synchronizing with the automotive speed grades of the automobile, and finding out an according camera lens zoom number of the automotive camera system changing synchronously with the current automotive speed grade of the automobile, which has installed the automotive camera system and is running on the road, under a current driving condition from the correspondence relationship table by the automotive camera system; and
    controlling a camera focal motor zooming camera lens to the according camera lens zoom number, which is found by the automotive camera system, by the automotive camera system, and achieving a synchronization between the shooting angles and the automotive speeds of the automobile.

2. The data processing method based on the shooting angles of the automotive camera system changing synchronously with the automotive speeds according to claim 1, wherein the current automotive velocity of the automobile includes a current running velocity value, a velocity changing rate value and/or an acceleration value per hour.

3. The data processing method based on the shooting angles of the automotive camera system changing synchronously with the automotive speeds according to claim 1, wherein in the determining the current automotive speed grade of the automobile by the automotive camera system,
    the current automotive speed grade is defined as a first speed grade when the current automotive velocity of the automobile is no more than 10 km/h;
    the current automotive speed grade is defined as a second speed grade when the current automotive velocity of the automobile is between 11 and 20 km/h;
    the current automotive speed grade is defined as a third speed grade when the current automotive velocity of the automobile is between 21 and 30 km/h;
    the current automotive speed grade is defined as a forth speed grade when the current automotive velocity of the automobile is between 31 and 40 km/h;
    the current automotive speed grade is defined as a fifth speed grade when the current automotive velocity of the automobile is between 41 and 50 km/h;
    the current automotive speed grade is defined as a sixth speed grade when the current automotive velocity of the automobile is between 51 and 60 km/h;
    the current automotive speed grade is defined as a seventh speed grade when the current automotive velocity of the automobile is between 61 and 70 km/h;
    the current automotive speed grade is defined as a eighth speed grade when the current automotive velocity of the automobile is between 71 and 80 km/h;
    the current automotive speed grade is defined as a ninth speed grade when the current automotive velocity of the automobile is between 81 and 90 km/h;
    the current automotive speed grade is defined as a tenth speed grade when the current automotive velocity of the automobile is between 91 and 100 km/h;
    the current automotive speed grade is defined as an eleventh speed grade when the current automotive velocity of the automobile is between 101 and 110 km/h; and
    the current automotive speed grade is defined as a twelfth speed grade when the current automotive velocity of the automobile is more than 110 km/h.

4. The data processing method based on the shooting angles of the automotive camera system changing synchronously with the automotive speeds according to claim 1, wherein a corresponding relationship between the automotive speed grades and the camera lens zoom numbers changing synchronously with the automotive speed grades specifically includes:
    the according camera lens zoom number is 1 when the current automotive velocity of the automobile is no more than 10 km/h;
    the according camera lens zoom number is 2 when the current automotive velocity of the automobile is between 11 and 20 km/h;
    the according camera lens zoom number is 3 when the current automotive velocity of the automobile is between 21 and 30 km/h;
    the according camera lens zoom number is 4 when the current automotive velocity of the automobile is between 31 and 40 km/h;
    the according camera lens zoom number is 5 when the current automotive velocity of the automobile is between 41 and 50 km/h;

the according camera lens zoom number is 6 when the current automotive velocity of the automobile is between 51 and 60 km/h;

the according camera lens zoom number is 7 when the current automotive velocity of the automobile is between 61 and 70 km/h;

the according camera lens zoom number is 8 when the current automotive velocity of the automobile is between 71 and 80 km/h;

the according camera lens zoom number is 9 when the current automotive velocity of the automobile is between 81 and 90 km/h;

the according camera lens zoom number is 10 when the current automotive velocity of the automobile is between 91 and 100 km/h;

the according camera lens zoom number is 10 when the current automotive velocity of the automobile is between 101 and 110 km/h; and the according camera lens zoom number is 10 when the current automotive velocity of the automobile is over 110 km/h.

\* \* \* \* \*